United States Patent [19]

Choate

[11] 4,223,986
[45] Sep. 23, 1980

[54] SURFACE ILLUMINATOR

[75] Inventor: Albert G. Choate, Honeoye Falls, N.Y.

[73] Assignee: Automation Gages, Inc., Rochester, N.Y.

[21] Appl. No.: 883,478

[22] Filed: Mar. 6, 1978

[51] Int. Cl.³ .............................................. G03B 21/24
[52] U.S. Cl. ..................................... 353/80; 356/391; 353/85
[58] Field of Search ........................ 353/87, 84, 80, 55, 353/85, 57, 98, 99; 362/341, 345; 356/164, 165, 166, 388, 390, 391, 392, 393

[56] References Cited

U.S. PATENT DOCUMENTS

| 2,949,057 | 8/1960 | Polidor | 353/80 X |
| 3,143,035 | 8/1964 | Morgan | 353/87 |
| 3,566,101 | 2/1971 | Hagner | 353/87 X |
| 3,806,236 | 4/1974 | Downing | 353/98 X |
| 3,827,782 | 8/1974 | Boudouris et al. | 362/347 X |
| 3,922,085 | 11/1975 | Sheets | 353/98 X |

Primary Examiner—Harry N. Haroian
Attorney, Agent, or Firm—Shlesinger, Fitzsimmons & Shlesinger

[57] ABSTRACT

The light source comprises an elongate arc lamp surrounded by a paraboloidal reflector which, in one embodiment, projects an annular beam of light onto an annular reflector, or mirror, which in turn projects the light onto a workpiece. Reflected light from the workpiece is projected backwardly through an opening in the center of the mirror and is projected in known manner onto a viewing screen. In a second embodiment the mirror comprises a transparent member having a reflective spot (e.g., silver) in its center. In each embodiment a glass light filter is positioned between the light source and the associated mirror to filter out all but yellow and green light, and is inclined to the axis of the associated arc lamp to prevent direct reflection of ultraviolet light back at the lamp. The paraboloidal reflectors concentrate and direct collimated light toward the associated mirror thus eliminating need to employ separate collimating lenses and high wattage lamps.

12 Claims, 5 Drawing Figures

SURFACE ILLUMINATOR

This invention relates to surface illuminators, and more particularly to surface illuminators of the type that are used in contour projectors and the like.

Contour projectors, or optical comparators as they are also known, are utilized for inspecting and measuring complicated machine parts by projecting light onto selected surfaces of a part, and projecting the image of the illuminated part onto a screen where it can be readily viewed. A critical part of this equipment is the manner in which the inspected surface of the part is illuminated. Heretofore to secure satisfactory results it has been customary to utilize a powerful light source, such as a high wattage incandescent lamp to compensate for the diminution of light intensity caused by the use of beam splitters in the image reflecting stage. Also, a collimator is usually interposed between the light source and the workpiece in order to be able to direct parallel beams of light onto the part that is to be inspected.

One of the disadvantages of such prior apparatus is that high wattage lamps not only require a great deal of electrical energy, but they also generate proportionate quantities of heat which must be managed in order to prevent part damage and possible operator injury. Moreover, the need for employing a collimator also adds to the overall cost of the equipment, as well as making it more complicated and difficult to manufacture.

It is an object of this invention, therefore, to provide for contour projectors of the type described, an improved surface illuminator which obviates the need for employing exceptionally high wattage lamps, beam splitters and collimators.

Another object of this invention is to provide an improved surface illuminator which operates at substantially lower energy levels as compared to prior such illuminators, and as a result produces substantially less heat during its operation.

Still a further object of this invention is to provide an improved illuminator of the type described which utilizes in conjunction with its light source a novel paraboloidal reflector, which effectively collimates the reflected light, thereby enabling reduction of the energy required to illuminate the associated light source, and obviating also the need for employing a separate lens collimator for the light produced by this source.

It is an object also of this invention to provide for a surface illuminator an improved reflecting stage which utilizes instead of a beam splitter an annular reflector for directing light onto a workpiece, and a light filter for removing undesirable frequencies from the projected light beam.

Other objects of the invention will be apparent hereinafter from the specification and from the recital of the appended claims, particularly when read in conjunction with the accompanying drawings.

Figure 1:
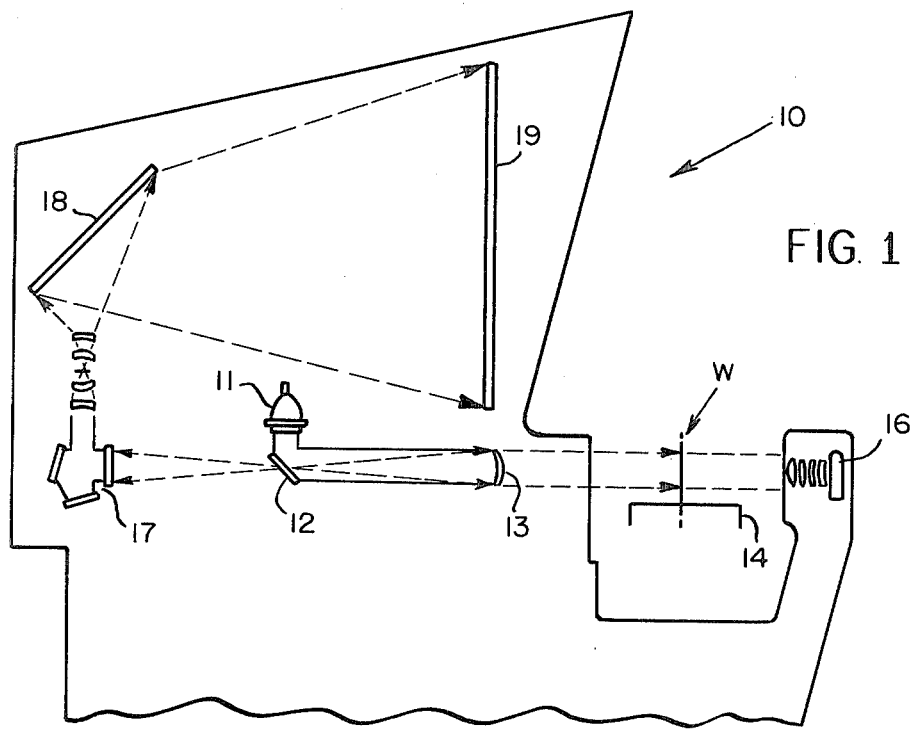
FIG. 1 is a schematic side elevational view of a contour projector containing a surface illuminator made in accordance with one embodiment of this invention.
Figure 2:
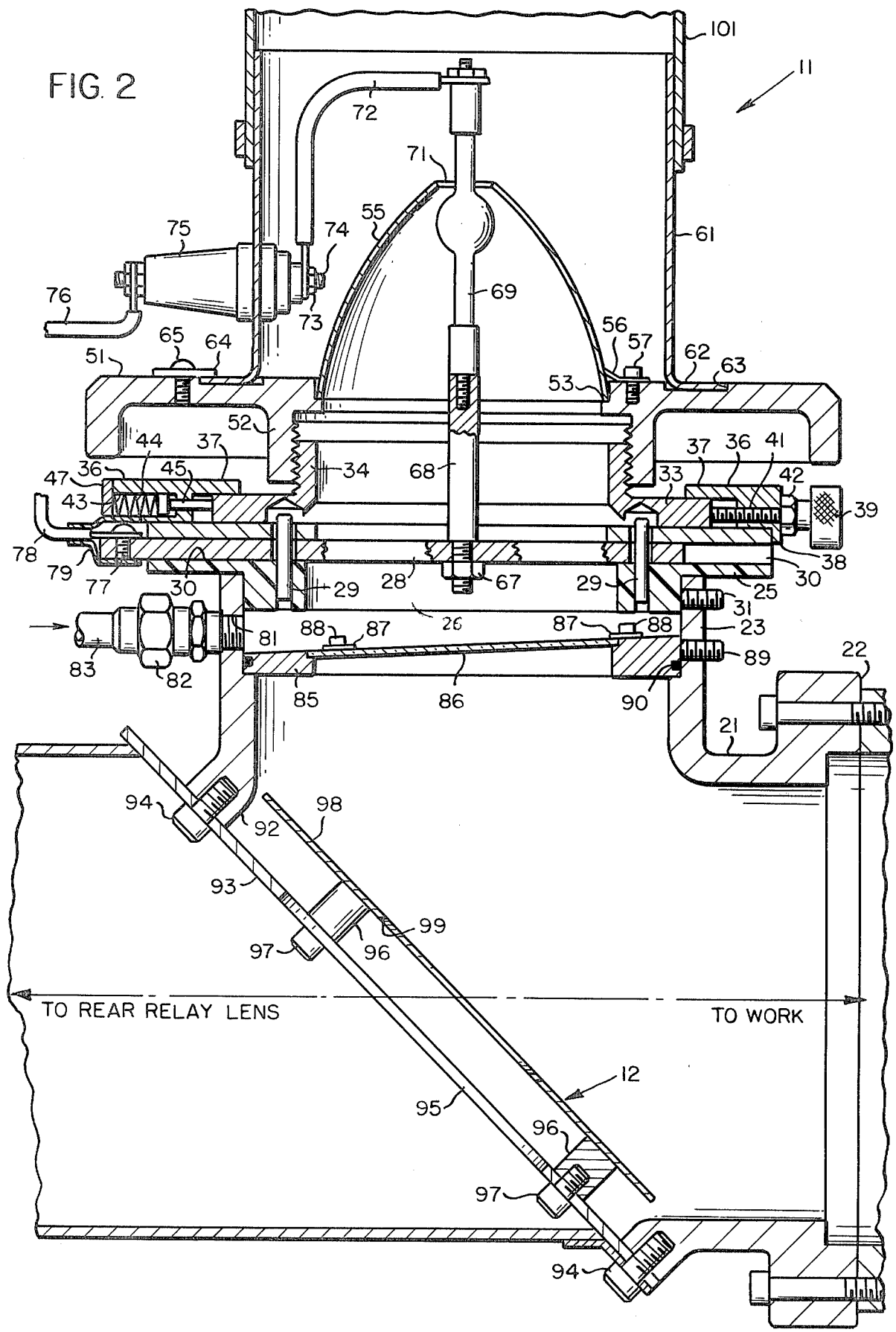
FIG. 2 is a greatly enlarged, fragmentary sectional view taken on a vertical plane through the center of the novel illuminator which forms part of this contour projector, parts of the illuminator being shown in full for purposes of illustration.

Referring now to the drawings by numerals of reference, and first to FIGS. 1 and 2, numeral 10 denotes a contour projector machine having a novel surface illuminator 11 which is illustrated in detail in FIG. 2. As noted in greater detail hereinafter, the illuminator 11 is designed to direct a beam of light downwardly onto a mirror system 12 in such manner that the beam is directed horizontally forwardly through a conventional lens system 13 onto a piece of work W. The work W is held by a support 14 that is located in the usual manner at the front of the machine between its front lens system 13 and the opposed contour illuminator system 16. Light from the work W is reflected backwardly through the front lens system 13, through the mirror system 12 as noted hereinafter, and onto the rear relay lens system 17, which in known manner directs the reflected light upwardly and onto an inclined mirror 18, from which it is reflected forwardly and focused onto the viewing screen 19 where the image of the work W can be viewed.

Referring now to FIG. 2, the illuminator 11 comprises a rigid, elbow-type fitting 21, which is fixed in the frame of machine 10 with one circular, flanged end 22 thereof facing forwardly of the machine toward the work support 14. The opposite or upper end 23 of fitting 21 has its axial bore positioned vertically and at right angles to the axis of the opposite end 22.

Mounted on the upper end 23 of fitting 21 is an annular, dielectric mounting disc 25, which has a reduced-diameter hub portion 26 that projects coaxially into the upper end of the fitting. An elongate, metal mounting bar or rod 28 extends diametrally across the bore in disc 25 and has opposite ends thereof secured by nylon pins 29 in registering, radially extending openings 30, which are formed in the upper end of disc 25 at diametrally opposite sides thereof. To secure disc 25 releasably in fitting 21, one or more set screws 31 are threaded through the annular wall of fitting 21 adjacent its upper end 23, and into engagement with the hub portion 26 of disc 25. The plastic, dielectric disc 25 and pins 29 electrically insulate the mounting bar 28, which is made from an electrically conductive metal such as brass, from fitting 21 and remaining portions of machine 10.

Adjustably mounted on the upper surface of disc 25 is an annular mounting disc or base 33, which has a reduced-diameter annular hub portion 34 that projects coaxially upwardly therefrom. Surrounding the base 33 is an annular ring or clamp 36 having on its upper end an internal, circumferential flange portion 37, which slidably overlies the upper surface of the base 33 in radially spaced relation to its hub portion 34. Clamp 36 also has a downwardly projecting, annular skirt portion 38, which overlies the upper end of the disc 25 so that clamp 36 is secured against radial movement relative to the disc 25.

The mounting base 33 is adjustable on the upper surface of disc 25, and beneath the overhanging flange 37 of the clamp 36, by two adjusting screws 39, only one of which is shown in FIG. 2. Each screw 39 has a threaded shank 41, which threads adjustably through one of a pair of adjusting nuts 42, which are secured to the outer peripheral surface of the clamp 36 at two points spaced 90° from each other. The shank of each adjusting screw 39 extends through a registering radial bore in the clamp 36, and into engagement with the outer peripheral surface of base 33.

Diametrally opposite each adjusting screw 41 the clamp 36 has in its outer peripheral surface a radially extending opening 43 containing in its outer end a compression spring 44, and housing at its inner end the head of a preload pin 45. Each pin 45 has a reduced-diameter shank that projects slidably through a radial bore in the clamp 36 and into engagement with the outer peripheral surface of the base 33 at a point thereon diametrally opposite one of the screws 39. The outer end of each opening 43 in ring 36 is closed as at 47, so that the spring 44 in the associated opening 43 urges the inner end of the associated pin 45 resiliently into engagement with the peripheral surface of base 33. As a consequence, the two screws 39 can be adjusted to effect horizontal shifting movement of the base 33 on the disc 25 selectively in two directions which extend normal to each other.

Mounted on base 33 is a generally annular, mirror mounting disc 51 having a reduced-diameter, internally threaded hub portion 52, which is adjustably threaded coaxially onto the upper end of the externally-threaded hub portion 34 of base 33. Seated at its lower, open end on an internal shoulder 53, which is formed by a counterbore in the upper end of the disc 51, is an inverted, paraboloidal reflector 55. Reflector 55 is secured against the shoulder 53 by a plurality of flexible clamps 56 each of which is secured at one end by a screw 57 to the upper surface of disc 51, and is resiliently engaged at its opposite end with the outer, curved surface of reflector 55.

A cylindrical hose fitting 61 has a flared lower end 62, which is seated in an annular recess 63 formed coaxially in the upper surface of disc 51 radially outwardly of its bore and the reflector 55. End 62 is secured beneath a plurality of clamp washers 64 (only one of which is shown in FIG. 2) that are releasably secured by screws 65 to disc 51 at angularly spaced points about its axis.

Secured at its lower end by a nut 67 to the center of the mounting bar 28, and projecting upwardly and coaxially through the bore in hub 34 is a cylindrical socket member 68 for a conventional mercury arc lamp 69. At its upper end lamp 69 projects coaxially through a small, circular opening 71, which is formed in the upper end of the reflector 55 coaxially thereof. At its upper end above the reflector 55 the lamp 69 is releasably connected in the usual manner to one end of a wire lead 72. The outer end of lead 72 is secured by a nut 73 to the inner end of a conductor 74 that extends through the center of a ceramic insulator 75, which is secured intermediate its ends in an opening in the wall of fitting 61. At its outer end the conductor 74 is connected in conventional manner to a flexible wire lead 76, which is adapted to be connected to one side of a power supply as noted hereinafter.

As shown at the left hand side of FIG. 2, the metal bar 28 projects beyond the outer peripheral surface of disc 25 where it is secured by a rivet 77 or the like to one end of another electrical lead 78. To prevent any undesirable shorting the connection between the bar 28 and the lead 78 is enclosed in a plastic insulating jacket 79.

Just beneath the lower end of the mounting disc hub 26 the fitting 21 has therein a radial port or opening 81 connected by a conventional coupling 82 to one end of a tube or pipe 83, which is adapted to be connected to a supply of cooling air.

Removably mounted on the inclined, upper surface of a ring 85, which is mounted in the upper end 23 of fitting 21 beneath the air inlet port 81, is a flat, disc-shaped glass filter 86, marginal edges of which are secured beneath clamping washers 87 that are fastened to the upper surface of ring 85 by screws 88. Also, one or more set screws 89 can be threaded through radial openings in the annular wall of fitting 21 to engage the outer peripheral surface of ring 85 to hold it in place. Likewise, a resilient O-ring 90 is mounted in a circular recess in the outer peripheral surface of ring 85 adjacent its lower end for engagement with the inner peripheral wall of the fitting 21 to prevent the escape of cooling air downwardly past the ring 85 and the filter 86.

Mounted in an opening 92 formed in the fitting 21 beneath the illuminator assembly 11, and in horizontal registry with opening 22 of the fitting, is the previously-mentioned mirror assembly 12. This assembly comprises a mounting plate 93 secured by screws 94 across the opening 92 at an angle of approximately 45° to the axes of both ends of fitting 21, so that a circular opening 95 in the center of plate 93 has its axis extending through the intersection of the axes of the two ends 22 and 23 of fitting 21, and at an angle of 45° thereto. Secured on the upper ends of a plurality of cylindrical spacers 96 that are fastened by nuts 97 to a plate 93 is an annular mirror or reflecting element 98, which also is positioned so that its reflecting surface lies in a plane which extends at an angle of 45° to the axes of both ends 22 and 23 of fitting 21, and at right angles to the common plane containing these two axes. Mirror 98 has in its center an elliptical opening 99 that is smaller than, and registers coaxially with, the opening 95 in plate 93, and which appears circular when viewed along a vertical or horizontal axis through its center.

After the illuminator assembly 11 has been assembled the disc 51 is threadably adjusted on the hub 34 vertically to adjust the reflector 55 relative to the lamp 69 so as to place the center of the lamp on the focus of the paraboloidal reflecting surface defined by the inside surface of the reflector. At this time the two screws 39 may also be adjusted to shift the base 33 horizontally and selectively in X and Y directions against the resistance of the spring-loaded pins 45, thereby to position the reflector 55 coaxially of the lamp 69. These adjustments are usually made at the time that the unit is assembled at the factors, and may need to be adjusted only after arc lamp replacement. The purpose of these adjustments is to position the reflecting member 55 so that light from the lamp 69 is reflected vertically downwardly and coaxially of the opening 99 in the mirror 98.

In use, cooling air is fed into assembly 11 through the tube 83 and the inlet 81, and passes upwardly around the outside of lamp 69, through the opening 71 in reflector 55, and to the exterior of the assembly through an exhaust hose 101, which is attached to the upper end of the fitting 61. This cooling air exhausts much of the heat that is generated by the lamp 69 during use.

Lamp 69 is energized by applying across lines 76 and 78, initially, a 20 kv. starting voltage which turns the lamp 69 on after which the voltage drops in known manner to approximately seventy-five volts to maintain the lamp illuminated during use. The paraboloidal reflecting surface on the inside of the reflector 55 functions in a manner similar to a collimator, in that it focuses most of the illumination from the lamp 69 vertically downwardly through the bores in the registering hub portions 34 and 26 of members 33 and 25, respectively, around opposite sides of the supporting bar 28, and downwardly through the heat filter 86 toward the annular mirror 98. The upper surface of filter 86, which is inclined slightly to the horizontal, reflects ultraviolet light at an angle inclined to the axis of lamp 69, and therefore prevents excessive accumulation of heat in the arc lamp 69. The filter 87 itself allows only yellow and green light to pass therethrough. In effect it removes everything but peak visual light, thereby minimizing the heat that will be reflected by the surface of mirror 98 toward the work W. Preferably, however, the work itself is also subjected to cooling air to prevent excessive heating thereof by the light reflected from mirror 98.

Heretofore in many conventional contour projectors it has been customary to employ a beam splitter, rather than an annular mirror 98 of the type shown in FIG. 2. The advantage of using the mirror 98 is that the opening 99 in its center registers with the center of the lamp 69, or in other words with the dark spot at the center of the light source represented by the lamp. The illumination reflected downwardly by the reflector 55, on the other hand, is directed toward the annular reflecting surface of the mirror 98 which lies around the outside of the central opening 99; and all of this light is reflected at right angles to the axis of lamp 69, out of the end 22 of the fitting 21 toward the work W (FIG. 1). The light reflected back from the work toward the mirror assembly 12 passes first through the forward lens assembly 13, which focuses the reflected light onto the center of the opening 99 in the mirror 98. After passing through opening 99 this reflected light passes through the opening 95 in the supporting plate 93 and falls upon the rear lens system 17 (FIG. 1), which directs the reflected light upwardly toward the mirror 18 and then onto the screen 19 as noted above.

One of the major advantages of using the paraboloidal reflector 55 is that it obviates the need for employing a collimator to form parallel light beams for projection onto the work W, since the configuration of the reflector 55 itself tends to concentrate and collimate the light which it reflects toward the mirror 98. While it would be possible to employ, if desired, a beam splitter in place of the mirror assembly 12, an advantage of using the annular mirror 98 is that there is substantially less loss in the intensity of the light that is reflected onto and off of the work, as compared to the loss that would prevail if a beam splitter were to be employed.

In addition to concentrating light from the lamp 69 most effectively, the paraboloidal reflector 55 permits the use of a substantially less powerful lamp. For example, where heretofore it was customary and necessary to employ upwardly of a 2000 watt lamp for illuminating work in the manner illustrated in FIG. 1, it has been discovered that the novel illuminator device disclosed herein will function very well with a lamp of substantially less wattage. Moreover, by employing the inclined filter member 86, which permits the isolation of the yellow and green line components of the mercury spectrum the undesirable thermal effects of the lamp are minimized, while the intensity of the visual light is maximized.

Figure 3:
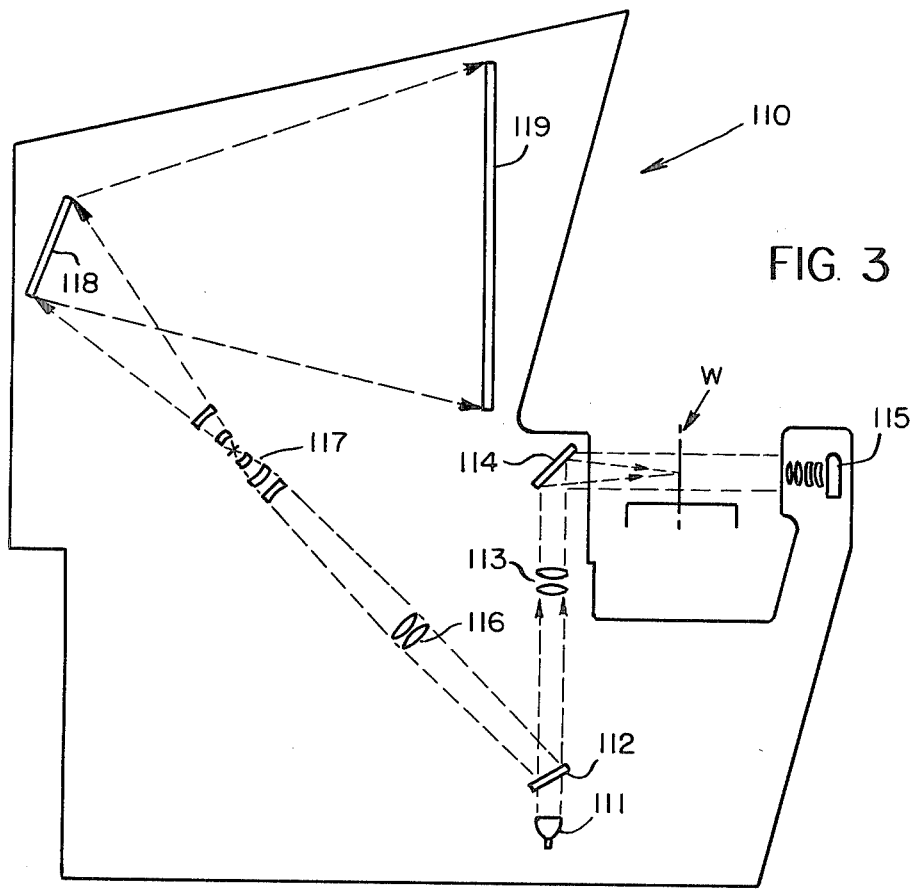
FIG. 3 is a schematic side elevation view of another form of contour projector having therein a surface illuminator made in accordance with a second embodiment of this invention.
Figure 4:
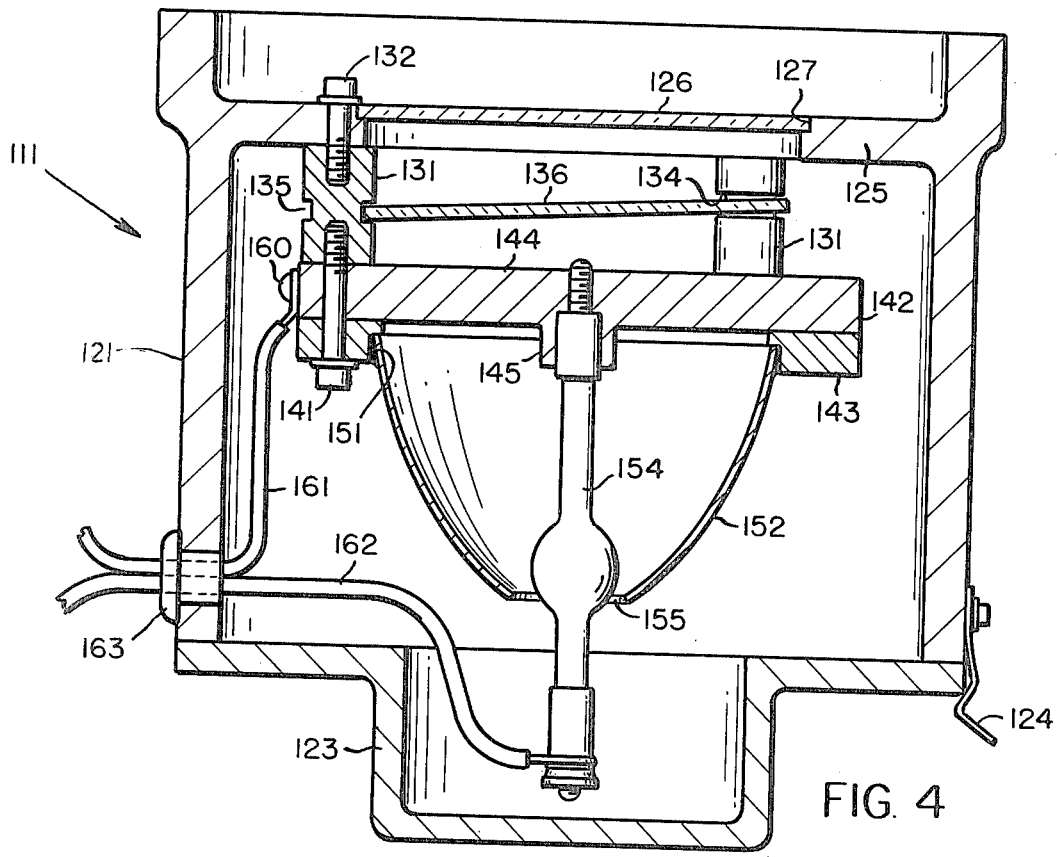
FIG. 4 is an enlarged, fragmentary sectional view taken on a vertical plane through the center of the illuminator made in accordance with this second embodiment of the invention, parts of this illuminator also being shown in full.
Figure 5:
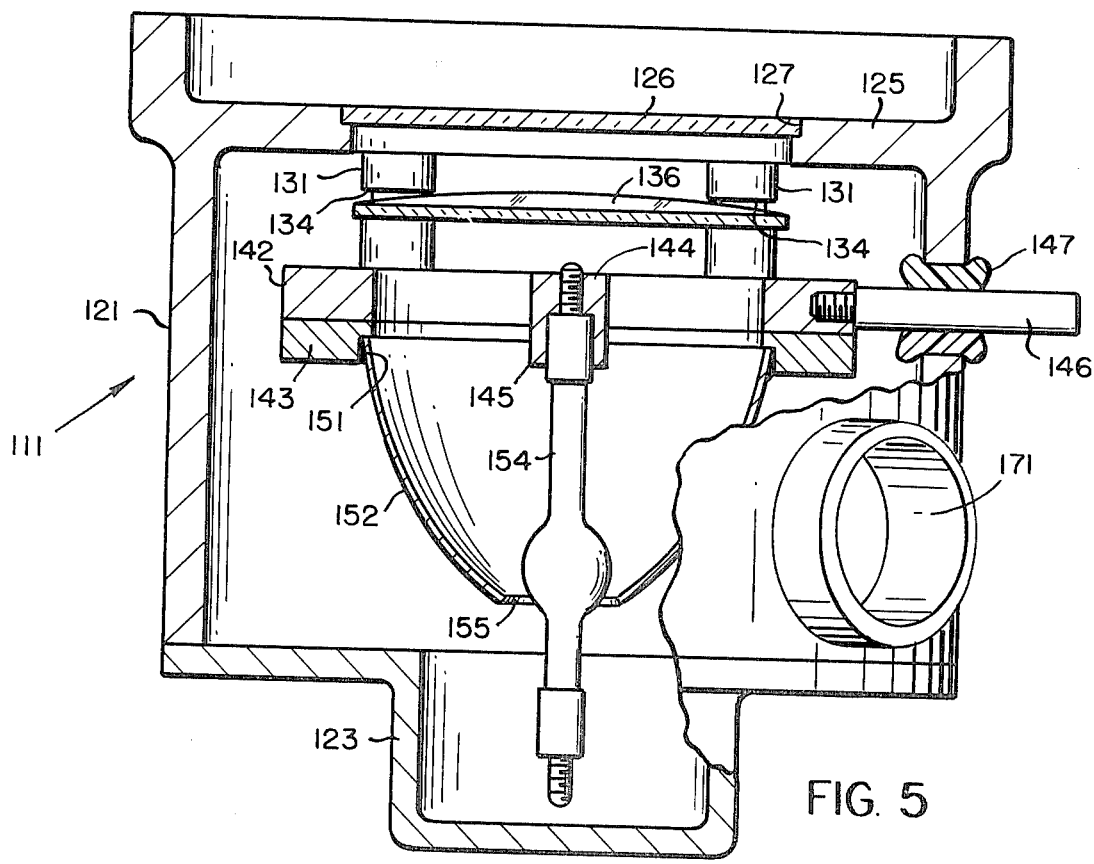
FIG. 5 is a fragmentary sectional view of this modified illuminator taken along a vertical plane disposed at 90° to the plane on which the view of FIG. 4 was taken.

Referring now to the embodiment shown in FIGS. 3 to 5 numeral 110 denotes generally another type of contour projector machine which contains a modified surface illuminator 111 which is adapted to be mounted in the machine to direct light vertically upwardly through a modified mirror assembly 112 and a relay lens assembly 113 onto an inclined mirror 114, which directs the light toward the work W and the contour illumination collimator 115. Light reflected from the work W is reflected downwardly by the mirror 114 through the lens assembly 113 and onto, for example a silver spot located in the center of the mirror assembly 112. This spot (not illustrated) directs the reflected image diagonally rearwardly and upwardly through the lens systems 116 and 117 onto the mirror 118 which reflects the image forwardly onto the projection screen 119 as in the preceeding embodiment.

Referring now to FIGS. 4 and 5, the modified illuminator assembly 111 comprises a cylindrical housing 121 having an open, lower end covered by a removable cap 123, which is secured by spring clips 124 to the housing. Adjacent its upper end housing 121 has an internal circumferential flange 125, the axial bore of which is covered by a disc-shaped window 126, which is seated coaxially in an annular recess 127 in flange 125.

Projecting from the underside of flange 125 within the housing 121 are three, cylindrical, lamp supporting members 131. Each member 131 is secured to the underside of flange 125 by a screw 132 (FIG. 4), which threads downwardly through the flange 125 and into the upper of each member 131 coaxially thereof. Two of the members 131 are located adjacent one diametral side of the flange 125 and have intermediate their ends registering, circumferential recesses or grooves 134. The remaining member 131 is located adjacent the opposite side of flange 125 and has intermediate its ends a circumferential groove 135, which is positioned slightly lower, relative to the flange 125, then the grooves 134 in the other two members 131. Supported adjacent its marginal edge in the grooves 134 and 135 is a glass filter member 136, which is inclined slightly to the horizontal as a consequence of groove 135 being slightly lower than the grooves 134.

Members 131 project equidistantly beneath the flange 125 and have a pair of rigid supporting members 142 and 143 secured one above the other to their lower ends by screws 141. Members 142 and 143 are generally annular or ring-shaped in configuration, and have registering axial bores that are disposed coaxially of the bore in the housing flange 125. The upper support member 142, however, has an integral, transverse bar portion 144, which extends diametrally across the bore in member 142, and which has intermediate its ends a cylindrical, downwardly projecting socket portion 145 that is also located coaxially of flange 125.

For effecting slight adjustment of the support members 142 and 143, an adjuster rod or pin 146 (FIG. 5) is threaded at its inner end into the peripheral surface of member 142 along an axis extending at right angles to the bar 144 of the member, and projects slidably at its opposite end through a bore in a sponge seal 147 (FIG. 5), which is secured in a registering opening in the annular wall of housing 121.

An upwardly facing, paraboloidal reflector 152 is secured around its upper, open end by epoxy cement, or the like, in a counterbore 151 formed in the lower end of the support member 143. Removably secured at one end in the socket 145 in the supporting bar 144 is a conventional mercury arc lamp 154. The other, lower end of this lamp projects through a small circular opening 155, which is formed in the lower end of reflector 152 coaxially thereof.

Power is supplied to the lamp 154 by a wire lead 161, which is fastened at one end by a screw 160 to the bar 144 of support 142, and at its opposite end extends through an insulator bushing 163 in the wall of housing 121 to the exterior of the latter. Another wire lead 162 is connected at one end to the opposite end of lamp 154 in conventional manner, and also extends out of housing 121 through the bushing 163. These two leads may be utilized to supply the necessary voltage for illuminating lamp 154 in a known manner. Electrical insulation may be employed, where necessary, to prevent any undesirable shorting of the power supply to the lamp 154.

Cooling air may be supplied to the interior of housing 121 through an aperture (not illustrated) conveniently located in the annular wall thereof; and the air may be withdrawn from the housing through a discharge port 171 (FIG. 5), which likewise can be located at any convenient spot for connection to an exhaust hose, or the like.

After assembly, the lamp 154 and its associated reflector 152 can be adjusted, if necessary, laterally of the bore in the flange 125 through the agency of the adjusting rod 146. Thereafter, when lamp 154 is illuminated, the reflector 152 will direct essentially collimated light vertically upwardly through the bore in the flange 125 and out of the upper end of housing 121 toward the above-described mirror assembly 112, which is shown schematically in FIG. 3. As in the case of the first embodiment, the light filter 136 causes ultraviolet light to be reflected at an angle inclined to the axis of lamp 154; and the filter transmits only yellow and green light thereby providing the most efficient illumination, while minimizing the quantity of heat which is transmitted with the light.

From the foregoing, it will be apparent that the instant invention provides relatively simple and inexpensive means for eliminating the need to employ high wattage lamps for surface illuminators of the type described, as well as eliminating the need for utilizing separate collimating lenses. Likewise, by employing an annular mirror 98, or in the case of the second embodiment a transparent mirror assembly which employs, for example, a reflective dot of silver in its center, the loss of illumination is minimized, and is considerably reduced as compared to illuminators which utilize beam splitters for this purpose. It will be apparent also that the illuminators illustrated herein are capable of being employed in other forms of contour projectors and/or optical comparators, which require intense, collimated light for illuminating a workpiece. In effect, the efficiency of the deep paraboloidal reflector disclosed herein produces a concentrated, intense light beam of a magnitude far better than is presently available by a conventional lens and tungsten (or arc) illuminated system, while using only a fraction of the input power to the lamp or light source. The annular beam which is produced by the elongate arc lamp surrounded by the paraboloidal reflector produces an annular beam of light, which compliments the annular mirror member which is utilized to inject the illumination into the imaging system. Moreover, by employing an inclined light filter of the type described herein, both the red and the infrared, violet and ultraviolet portions of the spectrum can be removed from the light beam, thus making it possible to provide the maximum input of visible light, while reducing the undesirable heating effects at the surface of the object or work that is being examined.

While only two embodiments of this invention have been illustrated and described in detail herein, it will be apparent that the invention is capable of still further modification, and that this application is intended to cover any such modifications as may fall within the scope of one skilled in the art or the appended claims.

Having thus described my invention, what I claim is:

1. A surface illuminator, comprising
   a housing having an opening in one end thereof,
   a lamp mounted in said housing opposite said opening,
   a paraboloidal reflector surrounding said lamp and having a large, open end facing said opening, and operative to reflect an annular beam of light from the lamp through said opening,
   a light filter mounted in said housing transversely of said opening therein and operative to filter light of selected frequencies from the light beam passing through said opening, and
   means mounting said lamp and said reflector for adjustment relative to one another in directions at right angles to the axes thereof,
   said lamp comprising an elongate mercury arc lamp having its center located approximately on the focus of said reflector, and extending through an opening in the end of said reflector opposite the large, open end thereof,
   means for supplying cooling air to said housing between said filter and said reflector,
   said filter having thereon a plane surface facing said reflector and inclined to the axis thereof to reflect ultraviolet light along an axis inclined to the axis of said reflected beam, and
   a mirror member mounted transversely of the axis of said reflector at the side of said filter remote from said lamp,
   said member having thereon an annular surface disposed in a plane inclined to the axis of said reflector and registering with the annular light beam passing through said opening.

2. A surface illuminator as defined in claim 1, wherein said mirror member has therethrough an elliptical opening registering with said lamp and the center of said annular surface, and said annular surface is a reflective surface inclined at an angle of 45° to axis of said reflector thereby to reflect said annular light beam at an angle of 90° to said axis of the reflector.

3. A surface illuminator as defined in claim 1, wherein the portion of said member registering with said annular surface is light transmissive, and a reflective spot is formed in said member coaxially within said annular surface.

4. A surface illuminator, comprising
   a housing having an opening in one end thereof,
   a lamp mounted in said housing opposite said opening,
   a paraboloidal reflector surrounding said lamp and having a large, open end facing said opening, and operative to reflect an annular beam of light from the lamp through said opening,
   a light filter mounted in said housing transversely of said opening and operative to filter light of selected frequencies from the light beam passing through said opening, and means mounting said lamp and said reflector for adjustment relative to one another in directions at right angles to the axes thereof, said lamp comprising an elongate mercury arc lamp having its center located approximately on the focus of said reflector, and extending through an opening in the end of said reflector opposite the large, open end thereof, said mounting means comprising a stationary base member having therethrough an axial bore registering with said opening in said housing, means for removably supporting one end of said lamp coaxially of said bore in said base member, a head member adjustably mounted on said base member and having an axial bore in registry with the bore in said base member and means supporting said large, open end of said paraboloidal reflector on the upper end of said head member coaxially of the bore therein and with the opposite end of said lamp projecting upwardly through said opening in said opposite end of said reflector.

5. A surface illuminator as defined in claim 4, including means mounting said head member on said base member for axial adjustment relative to said base member, and for adjustment laterally of the axis of the bore in said base member.

6. A surface illuminator, comprising a housing having an opening in one end thereof, a lamp mounted in said housing opposite said opening, a paraboloidal reflector surrounding said lamp and having a large, open end facing said opening, and operative to reflect an annular beam of light from the lamp through said opening, a light filter mounted in said housing transversely of said opening and operative to filter light of selected frequencies from the light beam passing through said opening, and means mounting said lamp and said reflector for adjustment relative to one another in directions at right angles to the axes thereof, said lamp comprising an elongate mercury arc lamp having its center located approximately on the focus of said reflector, and extending through an opening in the end of said reflector opposite the large, open end thereof, said mounting means comprising a pair of annular members mounted in said housing coaxially of said opening in said one end of said housing, and at the side of said filter remote from the last-named opening, means for releasably securing one end of said lamp in the bore of one of said annular members coaxially thereof, means mounting the large, open end of said reflector on the other of said annular members coaxially thereof, and with the opposite end of siad lamp projecting through said opening in said opposite end of said reflector, and an adjuster member projecting through a further opening in the wall of said housing and engaging one of said annular members to permit adjustment thereof from the exterior of said housing.

7. In a contour projector having a work support, a viewing screen, and a lens system for projecting light along a first axis onto a workpiece on said support, and for projecting a reflected image of said workpiece in the opposite direction along said axis and onto said screen, the improvement comprising means for producing, without the use of a collimating lens, an annular, collimated light beam for illuminating a workpiece on said support, a beam directing member in said lens system disposed in a plane intersecting said first axis and the axis of said annular, collimated light beam at an acute angle, and having an annular zone registering with said annular, collimated light beam to pass collimated light from said beam along and parallel to said first axis toward said workpiece to illuminate the latter, and having a central zone bound by said annular zone registering with the image reflected by said illuminated workpiece, and operative to pass said reflected image toward said screen, said beam producing means comprising an arc lamp, and a paraboloidal reflector surrounding said lamp and having an open, beam-directing end facing said beam directing member, and means mounting said reflector for adjustment relative to said beam directing member, and in a direction transverse to the axis of said annular beam.

8. A contour projector as defined in claim 7, wherein said annular zone is an annular reflective surface on said member facing said reflector to reflect said beam along said first axis toward said workpiece, and said central zone is an opening through said member in the center of said annular reflective surface.

9. A contour projector as defined in claim 7, wherein said annular zone is a transparent portion of said member operative to pass said annular beam directly through said member and along said first axis, and said central zone is a reflective surface on said member operative to reflect said reflected image along an axis inclined to said first axis and toward said screen.

10. A contour projector as defined in claim 7, including a light filter mounted in said projector between said lamp and said beam directing member to filter light of selected frequencies from said beam.

11. A contour projector as defined in claim 10, wherein said filter is a glass disc mounted in a plane extending transversely of the axis of said collimated beam and inclined slightly to the last-named axis.

12. A contour projector as defined in claim 7, wherein said mounting means includes means mounting said reflector for selective adjustment axially of said lamp and in at least two intersecting directions laterally of the axis of said lamp.

* * * * *